United States Patent [19]

Lee

[11] Patent Number: 5,617,336

[45] Date of Patent: Apr. 1, 1997

[54] METHOD FOR CHECKING TOP AND END OF TAPE FOR DATA RECORDING AND REPRODUCING APPARATUS

[75] Inventor: Sang Y. Lee, Seoul, Rep. of Korea

[73] Assignee: Goldstar Co., Ltd., Seoul, Rep. of Korea

[21] Appl. No.: 330,564

[22] Filed: Oct. 28, 1994

[30] Foreign Application Priority Data

Nov. 2, 1993 [KR] Rep. of Korea ............... 23131/1993

[51] Int. Cl.$^6$ ........................... G11B 15/00; G11B 15/08
[52] U.S. Cl. ...................... 364/550; 242/333.7; 360/74.2
[58] Field of Search ........................ 364/550, 560–562; 360/74, 74.2, 74.6; 242/333.7, 357

[56] References Cited

U.S. PATENT DOCUMENTS

| 3,730,453 | 5/1973 | Hotchkiss et al. |
| 3,834,648 | 9/1974 | Rose, Jr. et al. |
| 4,367,500 | 1/1983 | Furuta et al. ........................... 360/74.2 |
| 4,528,604 | 7/1985 | Koyama ................................. 360/74.2 |
| 5,309,300 | 5/1994 | Lee ........................................ 360/74.2 |

FOREIGN PATENT DOCUMENTS 2082373  3/1982  United Kingdom .

OTHER PUBLICATIONS

Patent Abstracts of Japan, Publication No. JP3250444 published Aug. 11, 1991.
Patent Abstracts of Japan, Publication No. JP3037854 published Sep. 19, 1991.
Patent Abstracts of Japan, Publication No. JP6012730 published Jan. 21, 1994.
Patent Abstracts of Japan, Publication No. JP55142442 published Jul. 11, 1980.
Patent Abstracts of Japan, Publication No. JP5706342 published Mar. 16, 1982.

*Primary Examiner*—Emanuel T. Voeltz
*Assistant Examiner*—Edward Pipala

[57] ABSTRACT

A method for checking top and end of tape for data recording and reproducing apparatus is disclosed. The method includes a first step for sensing a transparent tape section of a start portion of a tape wound about a tape take-up reel so as to sense the tape top. At a second step, a tape supply reel rotation period is detected and the detected supply reel rotation period is compared to a preset value. When the detected supply reel rotation period is not longer than the preset value, the tape end is checked at a predetermined period. However, when the detected supply reel rotation period is longer than the preset value, no tape end is checked. The method makes top-end checking time become optimal and saves power of the recording and reproducing apparatus, and reduces pulse noise generated in turning on or turning off the top-end checking LED.

8 Claims, 3 Drawing Sheets

FIRST REEL      SECOND REEL

METHOD FOR CHECKING TOP AND END OF TAPE FOR DATA RECORDING AND REPRODUCING APPARATUS

BACKGROUND OF THE INVENTION

1. Field of the Invention

The present invention relates in general to a method for checking top and end of a tape for data recording and reproducing apparatus and, more particularly, to an improvement in the top-end checking method for making the top-end checking time become optimal and for saving power of the recording and reproducing apparatus, and for reducing the pulse noise generated in turning on and turning off a top-end checking LED.

2. Description of the Prior Art

With reference to FIG. 1, there is shown a general theory for checking tape top and tape end for data recording and reproducing apparatus in accordance with the prior art. As shown in this drawing, when a tape cassette 1 having a top-end LED hole T-EH on the upper center of its bottom surface is loaded on a deck mechanism of the apparatus, a light emitting part 4 which comprises an LED and is provided on the deck mechanism will be aligned with the center of the top-end LED hole T-EH of the cassette 1. The opposite front side surfaces of the cassette 1 are provided with their light windows 3 and 3' for transmitting the light of the light emit part 4 to their associated light receive parts 5 and 5', which parts 5 and 5' are arranged on the deck mechanism so that they face the light windows 3 and 3' of the cassette 1 respectively. The deck mechanism of the data recording and reproducing apparatus further includes a head drum 2 which is placed in front of the loaded cassette 1. The head drum 2 has a head for recording or reproducing data on or from a tape of the cassette 1.

In order to check tape top and tape end through a typical checking method during recording or reproducing data on or from the tape of the cassette 1, the light emit part 4 aligned with the center of the top-end LED hole of the cassette 1 emits the light. When letting the first reel and the second reel of the cassette 1 of FIG. 1 be a tape supply reel and a tape take-up reel respectively, and letting the tape be primarily unwound from the first reel and be wound about the second reel, a first transparent tape section provided on the start portion of the tape appears and passes by the right window 3 of the cassette 1. In this case, the light of the light emit part 4 of the deck mechanism which was introduced into the hole T-EH of the cassette 1 is received by the light receive part 5 of the right side through both the first transparent tape section and the right window 3. However, when the magnetic coated tape section passes by the right window 3 after lapse of a predetermined time, the light of the light emit part 4 will not be transmitted to the light receive part 5 of the right side any more as the light can not be transmitted through the magnetic coated tape section. Thus, the light receive part 5 of the right side will recognize the tape top (i.e., the start of the tape). When the tape of the first reel is completely wound about the second reel, the light receive part 5' of the left side receives the light of the light emit part 4 through both a second transparent tape section provided on the end portion of the tape and the left window 3'. Hence, the light receive part 5' of the left side will recognize the tape end. When the tape runs in the reversed direction such as in a REWIND mode of the deck mechanism, the light receive part 5' of the left side will recognize the tape top, while the light receive part 5 of the right side will recognize the tape end.

However the above tape top and tape end checking method has a problem. That is, the distance between the light emit part 4 and each of the light receive parts 5 and 5' is longer than half of the length of the cassette 1. Due to the longer distance between the light emit part 4 and each light receive part 5 or 5', large amount of electric current should be sent to the LED of the light emit part 4 in order for letting the part 4 emit sufficient light. In this regard, the typical checking method for tape top and tape end should be accompanied by waste of large amount of electric power and this causes a serious problem in the data recording and reproducing apparatus. Particularly, portable VCRs such as camera-integrated VCRs should be reduced in their effective filming time since substantial part of charged electric power of them is consumed for checking the tape top and tape end. Furthermore, the top-end checking LED is limited in its life span, so that the LED may be short-lived when the LED is turned on continuously for checking the tape top and tape end. In order to extend the expected life span of the LED as well as to save the energy, the LED may be repeatedly turned on and turned off at regular time intervals. However, when repeatedly turning on and turning off the LED at regular time intervals as described above, there is caused a problem in that pulse noise is generated.

SUMMARY OF THE INVENTION

It is, therefore, an object of the invention to provide a method for checking top and end of tape for data recording and reproducing apparatus in which the above problems can be overcome and which detects, after sensing the tape top by a tape top sensor, a tape supply reel rotation period and checks the tape end at a predetermined checking period when the detected reel rotation period is not longer than a preset value.

In order to accomplish the above object, a method for checking top and end of tape for data recording and reproducing apparatus in accordance with a preferred embodiment of the invention comprising: a first step for sensing a transparent tape section of a start portion of a tape wound about a tape take-up reel so as to sense the tape top; a second step for detecting a tape supply reel rotation period and for comparing the detected supply reel rotation period to a preset value; and a third step for checking the tape end at a predetermined period when the detected supply reel rotation period is not longer than the preset value, but checking no tape end when the detected supply reel rotation period is longer than the preset value.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 3:
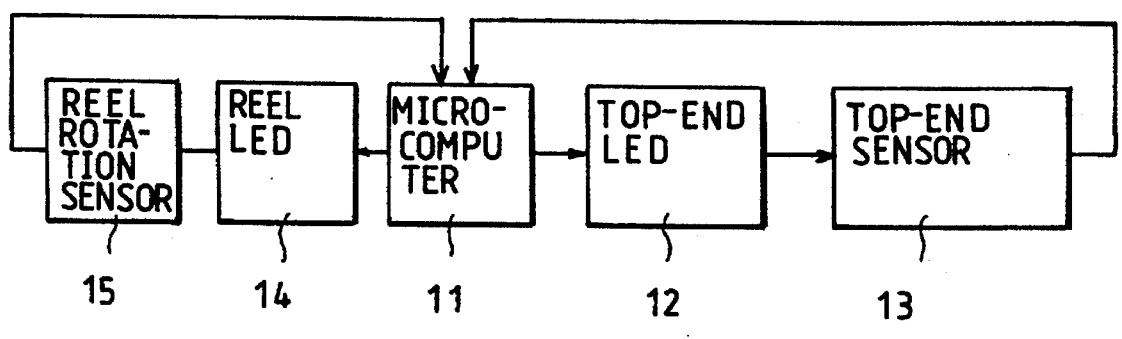
FIG. 3 is a block diagram of a circuit for checking tape top and tape end for data recording and reproducing apparatus in accordance with a preferred embodiment of the invention.

FIG. 3 is a block diagram of a circuit for checking tape top and tape end for data recording and reproducing apparatus in accordance with a preferred embodiment of the invention. As shown in this drawing, the checking circuit includes a microcomputer 11 for controlling the operation for checking the tape top and tape end. A top-end checking light emit diode 12 (hereinbelow, referred to simply as "the top-end LED") is coupled to the microcomputer 11 and emits light in response to a control signal of the microcomputer 11. The checking circuit also includes a top-end sensor 13 which senses the light of the top-end LED 12 and applies light sensing signals to the microcomputer 11. The microcomputer 11 is also coupled to a reel LED 14 which emits light in response to a control signal of the microcomputer 11. The checking circuit further includes a reel rotation sensor 15 which senses the light of the reel LED 14 and applies light sensing signals to the microcomputer 11.

The operational effect of the invention will be described hereinbelow.

Figure 4:
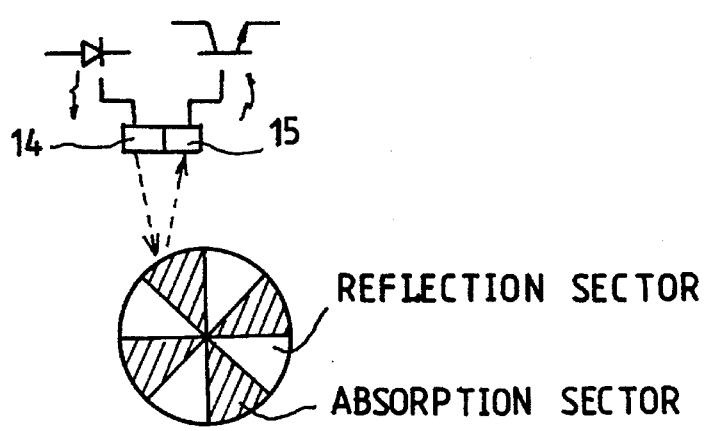
FIG. 4 is a schematic view showing the relation between a reel LED, a reel rotation sensor and a reel plate of FIG. 3.

In order to check the tape top and tape end as well as to sense a reel rotation, the microcomputer 11 outputs control signals to the top-end LED 12 and to the reel LED 14, so that the LEDs 12 and 14 emit their lights. When the reel LED emits its light as shown in FIG. 4 showing the relation between the reel LED 14, the reel rotation sensor 15 and a reel plate, the light absorption sectors of the reel plate absorb the light of the reel LED 14, which reel plate is rotated along with the reel. However, light reflection sectors of the reel plate reflect the light of the reel LED. Therefore, the reel rotation sensor 15, which senses the light reflected by reflections sections of the reel plate, outputs signals in the form of low signal—high signal—low signal—high signal to the microcomputer 11, thus to let the microcomputer 11 recognize the reel rotation. The top-end sensor 13 senses the light of the top-end LED 12 and outputs its signal to the microcomputer 11, thus to let the microcomputer 11 recognize the tape top or tape end.

The tape supply reel rotation period will be detected as follows.

Figure 1:
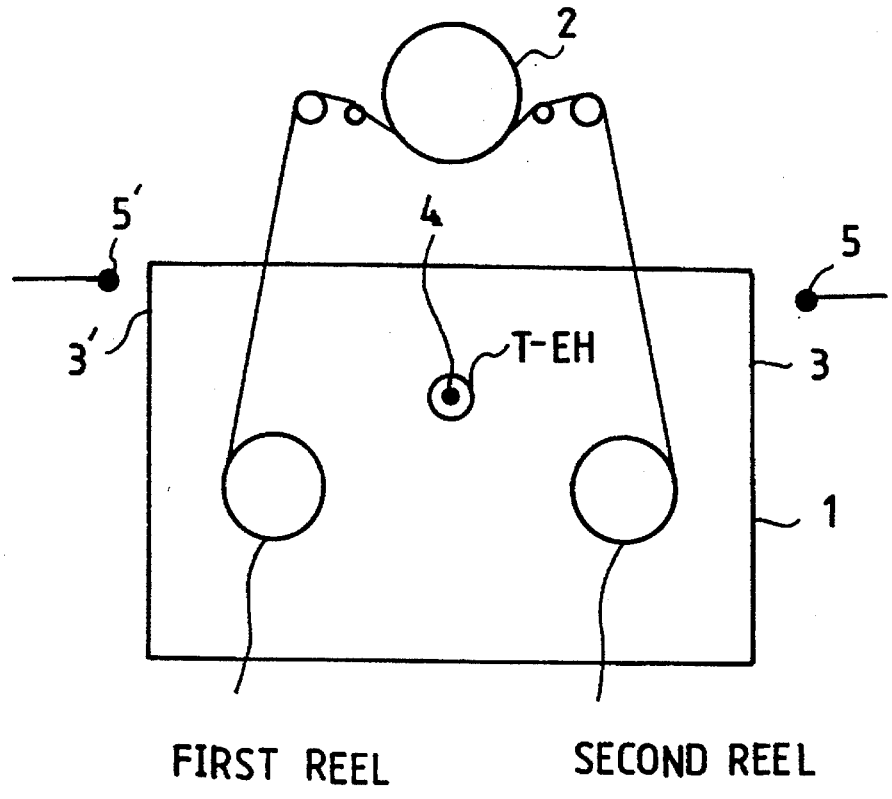
FIG. 1 is a schematic view showing a general theory for checking tape top and tape end for data recording and reproducing apparatus in accordance with the prior art.
Figure 2:
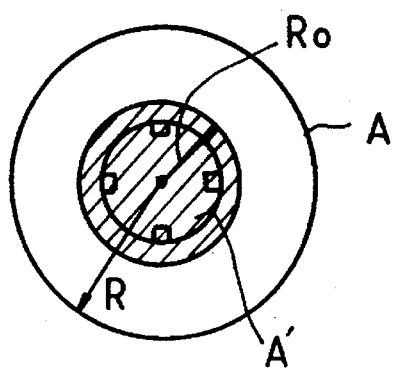
FIG. 2 is a plan view of a typical reel of a tape cassette.

When the tape of the supply reel is unwound from the supply reel and wound about the take-up reel, the tape amount supplied by the supply reel is equal to the tape amount wound about the hub of the take-up reel. That is, as shown in FIG. 2, the supplied tape amount will be equal to the result of subtraction of the area A' of the tape wound about the take-up reel from the area A of the tape, which area A is an area of the tape when all the tape is wound about the supply reel. The supplied tape area is equal to the result of multiplying supplied tape length by the tape thickness. That is, $$\pi R^2 - \pi Ro^2 = V t \times L \quad (1)$$

wherein,

V: tape running velocity, t: tape running time
L: tape thickness
R: radius of tape wound about the supply reel
Ro: radius of hub During running of tape, the supply reel rotation period T is checked by the reel rotation sensor 15. The reel rotation period T for the radius R is represented by the following equation.

$$T = 2\pi R/V \quad (2)$$

From the above equations 1 and 2, the tape running time "t" will be represented by the following equation.

$$t = [VT^2/4\pi L] - [\pi Ro^2/VL] \quad (3)$$

In the above equation 3, the tape running velocity V is preset for respective velocities of operational modes of the deck mechanism. When no tape is wound about the reel, the tape running time t is zero, so that a supply reel hub rotation period $T_{HUB}$ obtained when only the supply reel hub is rotated with no tape wound about the supply reel will be obtained from the equation 3. This reel hub rotation period $T_{HUB}$ is represented by the following equation on the base of the equation 2.

$$T_{HUB} = 2\pi Ro/V$$

Therefore, the optimal time for checking the tape end is preferably set in the manner that the tape end is sensed when the supply reel period T is slightly longer than the reel hub rotation period $T_{HUB}$ in the case of all tape unwound from the supply reel. However, there is generated an error t1 caused by rounding off to the nearest whole number in practical operation of the microcomputer 11 as well as caused by the fact that the tape running is not continuously sensed, the optimal time for checking the tape end is practically set in the manner that the tape end is sensed when the supply reel period T is slightly shorter than $T_{HUB}+t1$.

On the other hand, the tape end checking period T1, otherwise stated, the period for turning on the top-end LED 12 is that the shorter of the length L1 of the transparent tape section provided on the end portion of the tape and the length L2 of the tape passage between the drum 2 and the tape supply reel is shorter than the tape supply period. This is for preventing the transparent tape section from coming into contact with the head of the drum and for letting the transparent tape section give no damage to the head. The period T1 for turning on the top-end LED 12 and for checking the tape end is represented by the following equation.

$$T1 = \min(L1, L2)/V$$

The LED turning on time $T_{on}$ for checking tape top and tape end is set in accordance with characteristics of the top-end LED 12 as well as of the top-end sensor 13. When the reel is the take-up reel, it is not necessary to check the tape end even when the reel rotation period T is not longer than $T_{HUB}+t1$.

From the above equations, the total time for turning on the LED during running of the tape from first to last is represented by the following equation.

$$T_{LED-ON} = \left[ \frac{V(T_{HUB}+t1)^2}{4\pi L} - \frac{\pi Ro^2}{LV} \right] \times \frac{T_{on} V}{\min(L1, L2)} \quad (4)$$

When the tape thickness L is not known in calculation of the equation 4, the smallest tape thickness 7 μm of an 8 mm tape will be preferably used.

The operational effect of the invention was experimentally proved as follows.

That is, when letting the reel checking time be 100 ms, the tape running velocity be 14.34 mm/sec, the shortest turning on time for LED be 3 msec, and the allowable length of the transparent tape section be 50 mm, the total time for turning on LED, $T_{LED-ON}$ was about 100 msec. When letting the resistance of the top-end LED 12 be 200 Ω and the voltage of the LED 12 be 5 V, the electric current which should be sent to the top-end LED 12 was 25 mA, so that 25 mAh of energy was consumed when the top-end LED 12 was continuously turned on while using an one hour running tape cassette. However, the checking method of the invention consumed only 0.6 µAh of energy under the same condition. In addition, the instant checking method preferably lengthened the expected life span of the top-end LED 12 by 36,000 times in comparison with when the LED 12 was continuously turned on.

Figure 5:
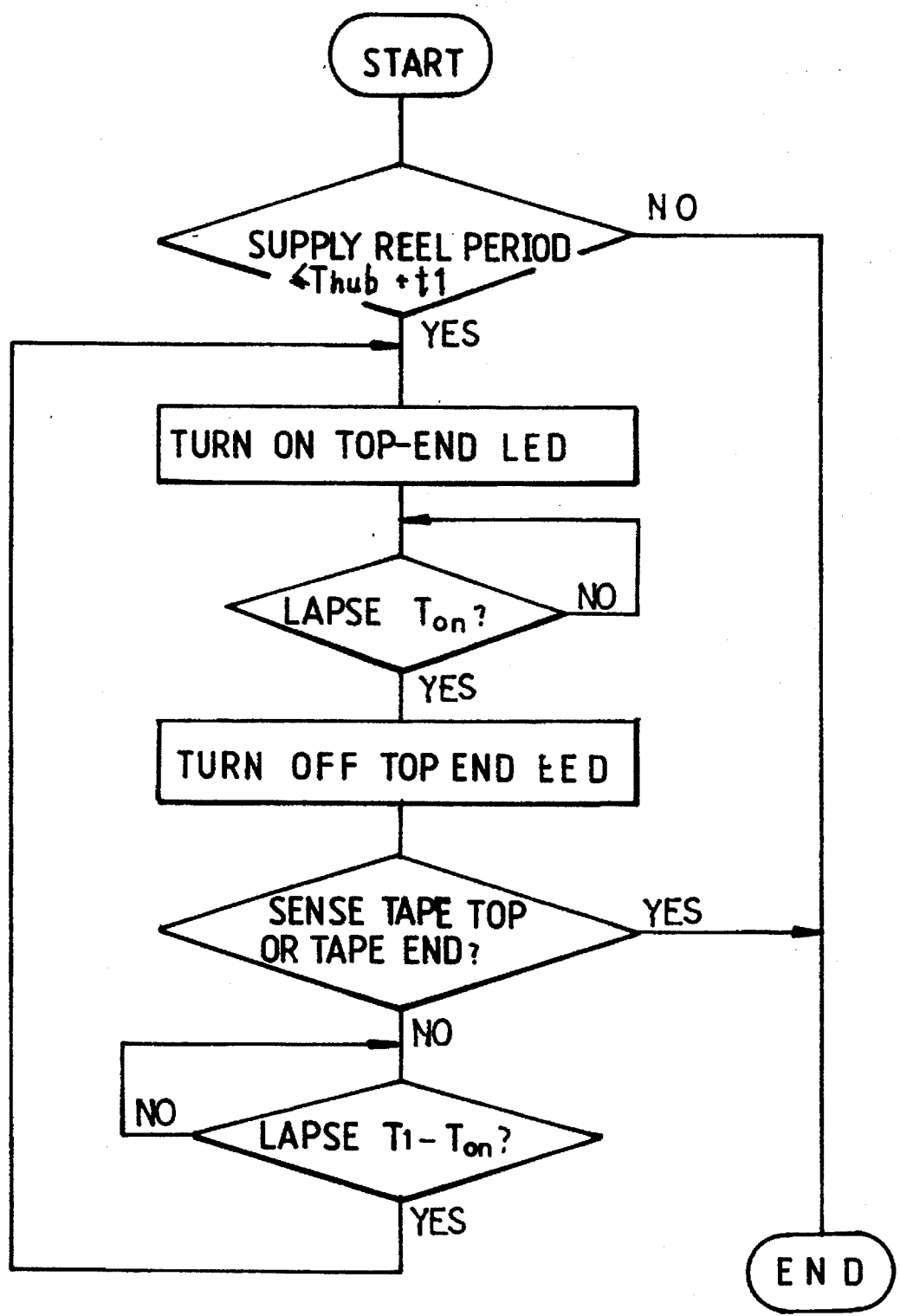
FIG. 5 is a flowchart showing the method for checking tape top and tape end for data recording and reproducing apparatus according to the invention.

FIG. 5 is a flowchart showing the method for checking tape top and tape end for data recording and reproducing apparatus according to the invention. As represented in the flowchart, the supply reel rotation period T is detected at first. The detected period T is, thereafter, compared with the preset value $T_{HUB}+t1$. When the detected period T is longer than the preset value $T_{HUB}+t1$, the tape end is not checked. However, when the detected period T is not longer than the preset value $T_{HUB}+t1$, the tape end is checked by turning on the top-end LED 12 for the predetermined time $T_{on}$. When neither the tape top nor the tape end is sensed within the predetermined time $T_{on}$, the tape end is checked by the tape end checking period T1 or by the period for turning on the top-end LED 12 which is that the shorter of the length L1 of the transparent tape section provided on the end portion of the tape or the length L2 of the tape passage between the drum 3 and the tape supply reel is shorter than the tape supply period.

It is noted that the actions of the tape supply reel and of the tape take-up reel will be reversed when the tape running direction is reversed.

As described above, the method for checking tape top and tape end for data recording and reproducing apparatus of the invention makes top-end checking time become optimal and saves power of the recording and reproducing apparatus, and reduces pulse noise generated in turning on or turning off the top-end checking LED.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for checking for an end of a tape fed from a supply reel to a take-up reel, comprising the steps of:
   detecting a tape supply reel rotation period;
   comparing the detected supply reel rotation period to a preset value; and
   only when the detected supply reel rotation period is not longer than the preset value, checking for the tape end at a predetermined checking period thereby performing efficient checking for the tape end.

2. The method according to claim 1, wherein the preset value is greater than a supply reel hub rotation period, the hub rotation period corresponding to when only a supply reel hub is rotated with no tape wound about it.

3. The method according to claim 1, wherein said predetermined checking period corresponds to an amount of time not greater than the time necessary for the supply reel to feed a length of a transparent tape section provided on an end portion of the tape.

4. The method according to claim 2, wherein the preset value is greater than the supply reel hub rotation period by a predetermined error amount.

5. The method according to claim 3, wherein said predetermined checking period corresponds to an amount of time not greater than the time necessary for the supply reel to feed a length of the tape to a predetermined location.

6. The method according to claim 5, wherein the predetermined location corresponds to a location of a recording/reproducing head.

7. The method according to claim 1, wherein said checking step includes the substeps of:
   turning on a light source for a predetermined light source time period;
   determining whether, while the light source is turned on, the tape end is detected;
   awaiting, if the tape end is determined not to be detected, the expiration of the predetermined checking period and then returning to said step of turning on the light source.

8. The method according to clam 1, wherein said detecting step is preceded by a step of:
   detecting a transparent tape section of a top portion of the tape wound about the take-up reel so as to detect the tape top.

* * * * *